(12) United States Patent
Kim et al.

(10) Patent No.: US 10,816,802 B2
(45) Date of Patent: Oct. 27, 2020

(54) TRANSPARENT DISPLAY APPARATUS, METHOD FOR CONTROLLING THE SAME, AND COMPUTER-READABLE RECORDING MEDIUM

(71) Applicants: SAMSUNG ELECTRONICS CO., LTD., Suwon-si (KR); Korea University Research and Business Foundation, Seoul (KR)

(72) Inventors: Jong-ok Kim, Seoul (KR); Jae-woo Kim, Seoul (KR); Tae-young Na, Hanam-si (KR); Kang-kyu Lee, Seoul (KR); Je-ho Ryu, Seoul (KR)

(73) Assignees: SAMSUNG ELECTRONICS CO., LTD., Suwon-si (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 54 days.

(21) Appl. No.: 15/922,307

(22) Filed: Mar. 15, 2018

(65) Prior Publication Data
US 2018/0267313 A1 Sep. 20, 2018

(30) Foreign Application Priority Data
Mar. 15, 2017 (KR) .................. 10-2017-0032426

(51) Int. Cl.
*G02B 27/01* (2006.01)
*G09G 3/20* (2006.01)
(Continued)

(52) U.S. Cl.
CPC .......... *G02B 27/0172* (2013.01); *G09G 3/001* (2013.01); *G09G 3/20* (2013.01);
(Continued)

(58) Field of Classification Search
CPC .......... G02B 27/0172; G02B 2027/014; G02B 2027/0138; G09G 3/001; G09G 3/20;
(Continued)

(56) References Cited

U.S. PATENT DOCUMENTS

| 2005/0243109 A1* | 11/2005 | Stevens | G06T 3/4007 345/694 |
| 2013/0328911 A1* | 12/2013 | Shimodaira | H04N 1/6027 345/603 |

(Continued)

FOREIGN PATENT DOCUMENTS

| JP | 5831305 B2 | 12/2015 |
| JP | 5868050 B2 | 2/2016 |

(Continued)

OTHER PUBLICATIONS

Joseph L. Gabbard et al., "More Than Meets the Eye: An Engineering Study to Empirically Examine the Blending of Real and Virtual Color Spaces", Technical Papers, Proceedings of IEEE Virtual Reality 2010, Waltham, Massachusetts, USA, Mar. 20-24, 79-86, (2010), (8 Pages Total).

(Continued)

*Primary Examiner* — Mark W Regn
(74) *Attorney, Agent, or Firm* — Sughrue Mion, PLLC

(57) ABSTRACT

A transparent display apparatus is provided. The transparent display apparatus includes a transparent display configured so that a background of the transparent display apparatus is projected thereto and configured to display an image; a camera configured to capture an image of a background direction of the transparent display apparatus to obtain a background image; and a processor configured to analyze image information of a background region projected to the transparent display in the obtained background image for each pixel, correct an image to be displayed on the transparent display using the analyzed image information of the (Continued)

background region, and control the transparent display to display the corrected image.

23 Claims, 7 Drawing Sheets

(51) Int. Cl.
G09G 3/34 (2006.01)
G09G 5/02 (2006.01)
G09G 3/3208 (2016.01)
G09G 3/00 (2006.01)

(52) U.S. Cl.
CPC ......... *G09G 3/2003* (2013.01); *G09G 3/3208* (2013.01); *G09G 3/3413* (2013.01); *G09G 5/02* (2013.01); *G02B 2027/014* (2013.01); *G02B 2027/0138* (2013.01); *G09G 2320/0666* (2013.01); *G09G 2340/06* (2013.01); *G09G 2354/00* (2013.01); *G09G 2360/145* (2013.01)

(58) Field of Classification Search
CPC .. G09G 3/3208; G09G 3/3413; G09G 3/2003; G09G 5/02; G09G 2360/145; G09G 2354/00; G09G 2340/06; G09G 2320/0666
See application file for complete search history.

(56) References Cited

U.S. PATENT DOCUMENTS

| 2014/0009486 | A1* | 1/2014 | Matsui | G06T 11/001 |
| | | | | 345/590 |
| 2015/0371579 | A1 | 12/2015 | Yu et al. | |
| 2016/0027388 | A1 | 1/2016 | Seo et al. | |
| 2016/0104302 | A1 | 4/2016 | Lee et al. | |
| 2016/0225190 | A1* | 8/2016 | Yamazaki | G02B 27/01 |
| 2016/0240125 | A1 | 8/2016 | Sridharan et al. | |

FOREIGN PATENT DOCUMENTS

| KR | 10-2015-0136052 A | 12/2015 |
| KR | 10-2016-0012258 A | 2/2016 |
| KR | 10-2016-0042680 A | 4/2016 |

OTHER PUBLICATIONS

Srikanth Kirshnamachari Sridharan et al., "Color Correction for Optical See-Through Displays Using Display Color Profiles", (2013), (10 Pages Total).

Christian Weiland et al., "Colorimetric and Photometric Compensation for Optical See-Through Displays", Universal Access in HCI, Part II, HCII 2009, LNCS 5615, 2009, Springer-Verlag Berlin Heidelberg 2009, (2009), (pp. 603-612, 10 Pages Total).

Tobias Langlotz et al., "Real-Time Radiometric Compensation for Optical See-Through Head-Mounted Displays", IEEE Transactions on Visualization and Computer Graphics, vol. 22, No. 11, (Nov. 2016), (pp. 2385-2394, 10 Pages Total).

* cited by examiner

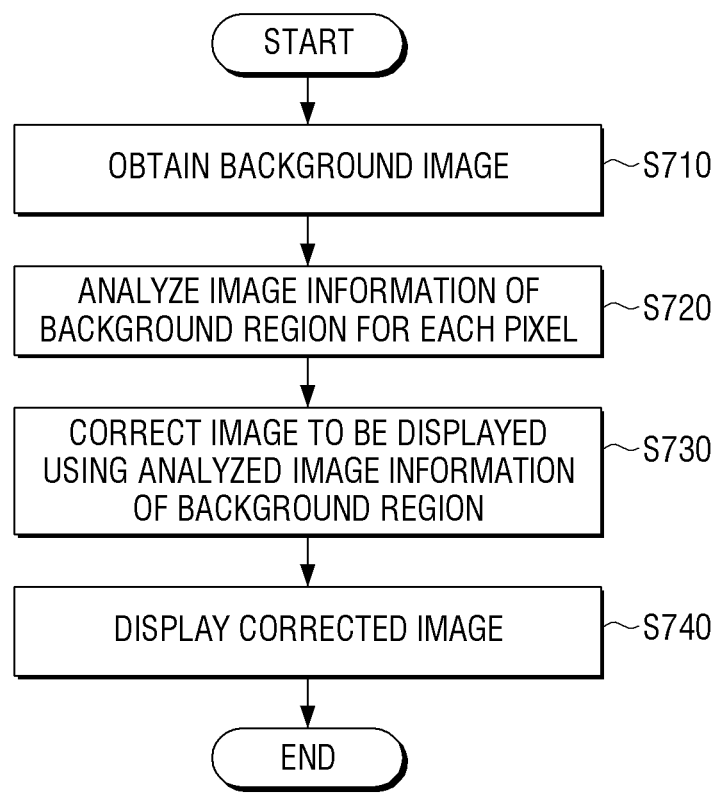

TRANSPARENT DISPLAY APPARATUS, METHOD FOR CONTROLLING THE SAME, AND COMPUTER-READABLE RECORDING MEDIUM

CROSS-REFERENCE TO RELATED APPLICATIONS

This application claims priority from Korean Patent Application No. 10-2017-0032426, filed on Mar. 15, 2017, in the Korean Intellectual Property Office, the disclosure of which is incorporated herein by reference in its entirety.

BACKGROUND

Field

Apparatuses and methods consistent with the disclosure relate to a transparent display apparatus, a method for controlling the same, and a computer-readable recording medium, and more particularly, to a transparent display apparatus capable of blocking a transmitted background image, a method for controlling the same, and a computer-readable recording medium.

Description of the Related Art

The popularity of smartphones and tablet personal computers (PCs) that have recently swept the world has changed life patterns as well as the propensity to consume. As such, nowadays, information technology (IT) apparatuses have a very close relationship with our daily lives. The reason is that anyone may easily use new technologies that may be seen only in movies until now. One typical new technology is 'augmented reality (AR)'.

A transparent display apparatus, which is a display apparatus through which a rear background of a screen is viewed, may simultaneously observe a background and a content, such that it is optimized for an augmented reality (AR) environment.

However, even in the case in which a user intends to watch only an image without the background, transmitted light transmitted through the transparent display apparatus and the displayed image are mixed with each other, such that visibility and image quality watched by the user are deteriorated.

Therefore, in the transparent display apparatus, the necessity for a technology of minimizing image information loss and color distortion of the image and blocking the transmitted light as desired by the user has increased.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a transparent display apparatus capable of blocking a transmitted background image, a method for controlling the same, and a computer-readable recording medium.

According to an aspect of the disclosure, a transparent display apparatus includes: a transparent display configured to display an image; a camera configured to capture an image of a background direction of the transparent display apparatus to obtain a background image; and a processor configured to analyze image information of a background region projected to the transparent display in the obtained background image for each pixel, correct an image to be displayed on the transparent display using the analyzed image information of the background region, and control the transparent display to display the corrected image.

The processor may convert the image information of the background region and the image information of the image to be displayed from an RGB colorimetric system into an XYZ colorimetric system, corrects the image to be displayed by subtracting a predetermined ratio of an XYZ value of the converted image of the background region from an XYZ value of the image to be displayed to correct the image to be displayed, convert the corrected image into the RGB colorimetric system, and provide the image converted into the RGB colorimetric system to the transparent display.

The predetermined ratio may be greater than 0 and smaller than or equal to 1.

The processor may determine the predetermined ratio on the basis of at least one of an absolute value of a negative number and a difference between a color of the corrected image recognized by a user and a color of the image to be displayed, in the case in which an XYZ value of the corrected image is the negative number.

The processor may determine the predetermined ratio to be a value in which an expected value of the absolute value of the negative number and the difference between the colors are minimal.

The processor may determine the predetermined ratio for each region on the basis of a boundary at which a difference of the XYZ value is a predetermined value or more in the case in which the boundary exists in the image of the background region.

The processor may determine the predetermined ratio for each frame of the image to be displayed.

The processor may determine the predetermined ratio for each of a plurality of frames of the image to be displayed.

The processor may determine the predetermined ratio for each of X, Y, and Z values of the image of the background region.

The transparent display apparatus may be an optical see-through head mounted display (OST-HMD).

According to another aspect of the disclosure, a method for controlling a transparent display apparatus includes: capturing an image of a background direction of the transparent display apparatus to obtain a background image; analyzing image information of a background region projected to a transparent display in the obtained background image; correcting an image to be displayed on the transparent display using the analyzed image information of the background region; and displaying the corrected image.

The correcting may include: converting the image information of the background region and the image information of the image to be displayed from an RGB colorimetric system into an XYZ colorimetric system; and correcting the image to be displayed by subtracting a predetermined ratio of an XYZ value of the converted image of the background region from an XYZ value of the image to be displayed to correct the image to be displayed, and the displaying may include: converting the corrected image into the RGB colorimetric system; and displaying the image converted into the RGB colorimetric system.

The predetermined ratio may be greater than 1 and smaller than or equal to 1.

The predetermined ratio may be determined on the basis of at least one of an absolute value of a negative number and a difference between a color of the corrected image recognized by a user and a color of the image to be displayed, in the case in which an XYZ value of the corrected image is the negative number.

The predetermined ratio may be determined to be a value in which an expected value of the absolute value of the negative number and the difference between the colors are minimal.

The predetermined ratio may be determined for each region on the basis of a boundary at which a difference of the XYZ value is a predetermined value or more in the case in which the boundary exists in the image of the background region.

The predetermined ratio may be determined for each frame of the image to be displayed.

The predetermined ratio may be determined for each of a plurality of frames of the image to be displayed.

The predetermined ratio may be determined for each of X, Y, and Z values of the image of the background region.

According to still another aspect of the disclosure, a non-transitory computer-readable recording medium includes a program for executing a method for controlling a transparent display apparatus, wherein the method for controlling a transparent display apparatus includes: capturing an image of a background direction of the transparent display apparatus to obtain a background image; analyzing image information of a background region projected to a transparent display in the obtained background image; correcting an image to be displayed on the transparent display using the analyzed image information; and displaying the corrected image.

According to still another aspect of the disclosure, a transparent display apparatus includes a transparent display configured display an image; a camera configured to capture an image behind the transparent display apparatus from a perspective of a user viewing the transparent display apparatus to obtain a background image; and a processor configured to analyze each pixel of image information of a background region projected to the transparent display in the obtained background image, correct an image to be displayed on the transparent display using the image information of the background region, and control the transparent display to display the corrected image.

The processor may be configured to convert the image information of the background region and the image information of the image to be displayed from an RGB colorimetric system into an XYZ colorimetric system, correct the image to be displayed by subtracting a predetermined percentage of an XYZ value of the converted image of the background region from an XYZ value of the converted image of the image to be displayed, convert the corrected image into the RGB colorimetric system, and provide the corrected image converted into the RGB colorimetric system to the transparent display.

The predetermined percentage may be greater than 0 and smaller than or equal to 1.

The processor may be configured to, in response to the XYZ value of the corrected image being a negative number, determine the predetermined percentage on the basis of at least one of an absolute value of the negative number and a difference between a color of the corrected image recognized by the user and a color of the image to be displayed.

The processor may be configured to determine the predetermined percentage to be a value in which an expected value of the absolute value of the negative number and the difference between the color of the corrected image recognized by the user and the color of the image to be displayed are minimal.

The processor may be configured to, in response to a boundary being included in the image of the background region, and in response to a difference between an XYZ value on one side of the boundary and an XYZ value on another side of the boundary being a predetermined value or more, determine the predetermined percentage for the one side of the boundary separately from the another side.

The processor may be configured to determine the predetermined percentage for each frame of the image to be displayed.

The processor may be configured to determine the predetermined percentage for each of a plurality of frames of the image to be displayed.

The processor may be configured to determine the predetermined percentage for each of X, Y, and Z values of the image of the background region.

The transparent display apparatus may include an optical see-through head.

According to still another aspect of the disclosure, a method for controlling a transparent display apparatus includes capturing an image behind the transparent display apparatus from a perspective of a user viewing the transparent display apparatus to obtain a background image; analyzing image information of a background region projected to a transparent display in the obtained background image; correcting an image to be displayed on the transparent display using the analyzed image information of the background region; and displaying the corrected image.

The correcting may further include converting the image information of the background region and the image information of the image to be displayed from an RGB colorimetric system into an XYZ colorimetric system; and correcting the image to be displayed by subtracting a predetermined percentage of an XYZ value of the converted image of the background region from an XYZ value of the converted image of the image to be displayed. The displaying may further include converting the corrected image into the RGB colorimetric system; and displaying the corrected image converted into the RGB colorimetric system.

The predetermined percentage may be greater than 0 and smaller than or equal to 1.

The predetermined percentage may be determined, in response to the XYZ value of the corrected image being a negative number, on the basis of at least one of an absolute value of the negative number and a difference between a color of the corrected image recognized by the user and a color of the image to be displayed.

The predetermined percentage may be determined to be a value in which an expected value of the absolute value of the negative number and the difference between the color of the corrected image recognized by the user and the color of the image to be displayed are minimal.

In response to a boundary being included in the image of the background region, and in response to a difference between an XYZ value on one side of the boundary and an XYZ value on another side of the boundary being a predetermined value or more, the predetermined percentage may be determined for the one side separately from the another side.

The predetermined percentage may be determined for each frame of the image to be displayed.

The predetermined percentage may be determined for each of a plurality of frames of the image to be displayed.

The predetermined percentage may be determined for each of X, Y, and Z values of the image of the background region.

According to still another aspect of the disclosure, a non-transitory computer-readable recording medium may include a program for executing a method for controlling a transparent display apparatus. The method for controlling the transparent display apparatus includes capturing an image behind the transparent display apparatus from a perspective of a user viewing the transparent display apparatus to obtain a background image; analyzing image information of a background region projected to a transparent display in the obtained background image; correcting an image to be displayed on the transparent display using the analyzed image information; and displaying the corrected image.

BRIEF DESCRIPTION OF THE DRAWING FIGURES

The above and/or other aspects of the disclosure will be more apparent by describing certain embodiments of the disclosure with reference to the accompanying drawings, in which:

FIG. 7 is a flow chart for describing a method for controlling a transparent display apparatus according to an embodiment of the disclosure.

DETAILED DESCRIPTION OF THE EMBODIMENTS

Figure 1:
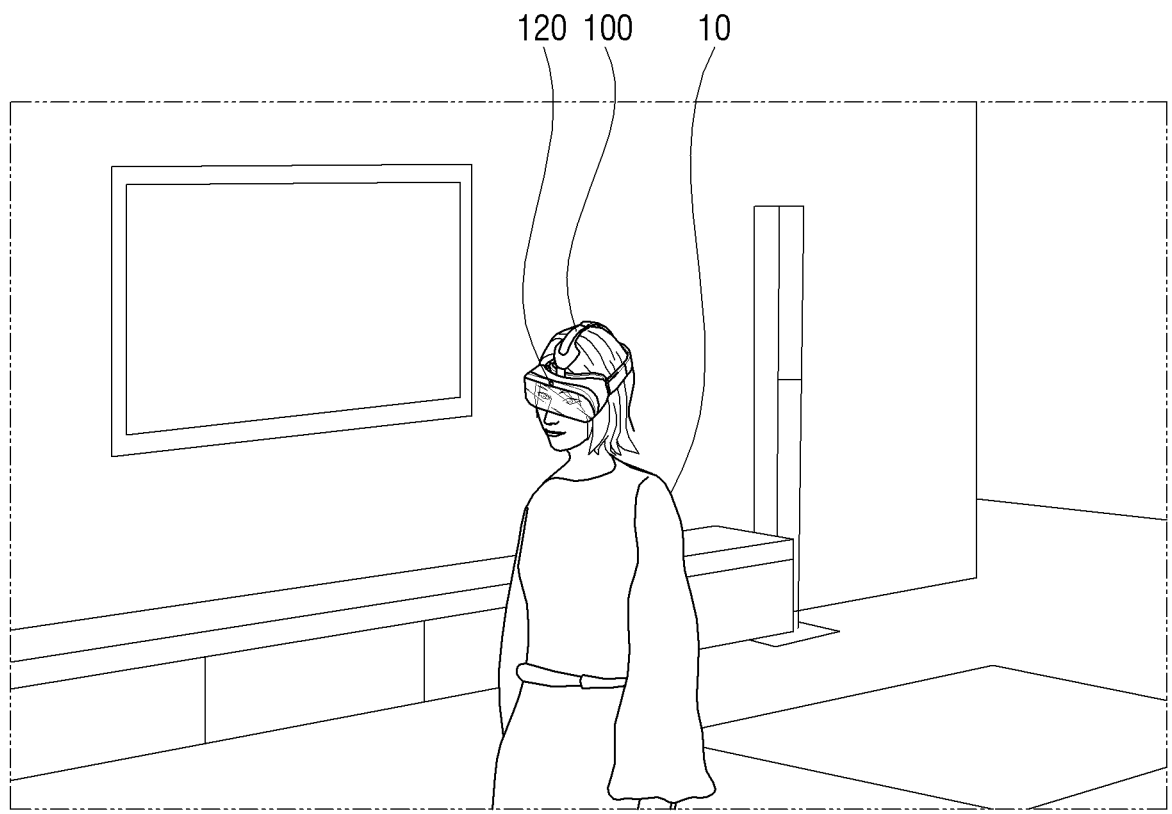
FIG. 1 is a view illustrating an example of a transparent display apparatus according to an embodiment of the disclosure.

After terms used in the specification are briefly described, the disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms may be mentioned in detail in a corresponding description portion of the disclosure. Therefore, the terms used in embodiments of the disclosure should be defined on the basis of the meaning of the terms and the contents throughout the disclosure rather than simple names of the terms.

Since the disclosure may be variously modified and have several embodiments, specific embodiments of the disclosure will be illustrated in the drawings and be described in detail in the detailed description. However, it is to be understood that the disclosure is not limited to specific embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Terms 'first', 'second', and the like, may be used to describe various components, but the components are not to be construed as being limited by these terms. The terms are used only to distinguish one component from another component.

Singular forms are intended to include plural forms unless the context clearly indicates otherwise. It will be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In embodiments, a 'module' or a '~er/or' may perform at least one function or operation, and be implemented by hardware or software or be implemented by a combination of hardware and software. In addition, a plurality of 'modules' or a plurality of '~ers/ors' may be integrated in at least one module and be implemented by at least one processor except for a 'module' or an '~er/or' that needs to be implemented by specific hardware.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments described herein. In addition, in the drawings, portions unrelated to the description will be omitted to obviously describe the disclosure, and similar reference numerals will be used to describe similar portions throughout the specification.

FIG. 1 is a view illustrating an example of a transparent display apparatus according to an embodiment of the disclosure.

Referring to FIG. 1, the transparent display apparatus 100 according to an embodiment of the disclosure means that at least some regions of a screen of the transparent display apparatus 100 viewed by a user are transparent. Here, the transparent display apparatus 100 may be implemented by various apparatuses including a transparent display to allow the user to view a background behind a display apparatus, such as a television (TV), an electric bulletin board, a laptop personal computer (PC), a mobile phone, a tablet PC, a personal digital assistants (PDA), an MP3 player, a kiosk, an electronic frame, a table display apparatus, and a wearable apparatus such as an optical see-through head mounted display (OST-HMD).

The user 10 may watch an image through the transparent display apparatus 100. Here, the image may include various images such as a content moving picture such as a game image depending on execution of a game application, a movie, a drama, or the like, a still image, a still cut, and the like. The user 10 may watch an image reproduced in the transparent display apparatus 100 together with a background projected through the transparent display apparatus 100. Here, the background may be the surrounding environment viewed through the transparent display apparatus 100. Meanwhile, according to an embodiment, the user 10 may watch only the image reproduced without the background as desired by the user.

The transparent display apparatus 100 according to the disclosure may remove a background overlapped with the reproduced image using a background image captured by a camera 120 included in the transparent display apparatus 100. In detail, the transparent display apparatus 100 may correct an image that is to be reproduced using the captured background image and display the corrected image to allow the user 10 to perform a recognition as if he/she watches only the image reproduced without the background. This will be described in detail below with reference to FIG. 2.

Meanwhile, in FIG. 1, for convenience of explanation, a case in which in which the camera 120 is disposed at an upper end of the center of the transparent display apparatus 100 is illustrated. However, the camera 120 is not limited thereto, but may be disposed at any one of a lower end and opposite side ends of the transparent display apparatus 100. Alternatively, the camera 120 may be disposed to be spaced apart from the transparent display apparatus 100 as a component separate from the transparent display apparatus 100 and capture an image of the surrounding environment of the transparent display apparatus 100, and the transparent display apparatus 100 may be implemented to use the captured image.

Figure 2:
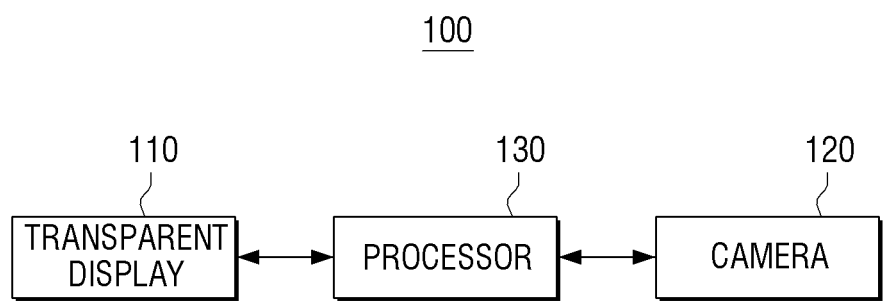
FIG. 2 is a block diagram illustrating a schematic configuration of the transparent display apparatus according to an embodiment of the disclosure.

FIG. 2 is a block diagram illustrating a schematic configuration of the transparent display apparatus according to an embodiment of the disclosure.

Referring to FIG. 2, the transparent display apparatus 100 includes a transparent display 110, the camera 120, and a processor 130.

The transparent display 110 may be configured so that a background of the transparent display apparatus 100 is projected thereto, and may display an image. In detail, the transparent display 110 may display a reproduced image as it is or display an image corrected by the processor 130, depending on a selection of the user or a kind of reproduced image.

The transparent display may be implemented in various types such as a transparent liquid crystal display (LCD) type, a transparent thin-film electroluminescent panel (TFEL) type, a transparent organic light emitting diode (OLED) type, a projection type, and the like, according to an embodiment.

The transparent LCD type means a transparent display apparatus implemented by removing a backlight unit from an LCD apparatus that is currently used and using a pair of polarizing plates, optical films, transparent thin-film transistors, transparent electrodes, and the like. In the transparent LCD apparatus, transmittance is low due to the polarizing plates, the optical films, or the like, and light efficiency is low due to ambient light used instead of the backlight unit, but there is an advantage that a large area transparent display may be implemented.

The transparent TFEL type means an apparatus that uses an alternating current (AC-TFEL) including transparent electrodes, an inorganic phosphor, and an insulating film. The AC-TFEL is a display in which accelerated electrons emit light by exciting the inorganic phosphor while passing through the inorganic phosphor. In the case in which the transparent display 110 is implemented in the transparent TFEL type, the processor 130 may adjust electrons to be projected to an appropriate position to determine information display position. Since the inorganic phosphor and the insulating film have transparent properties, a very transparent display may be implemented.

The transparent OLED type means a transparent display apparatus that uses self-luminous OLEDs. Since an organic light emitting layer is transparent, when both electrodes are used as transparent electrodes, the transparent display 110 may be implemented. In the OLED, electrons and holes are injected from both sides of the organic light emitting layer into the organic light emitting layer, and emit light while being combined with each other in the organic light emitting layer. The transparent OLED apparatus may display information by injecting the electrons and the holes into desired positions using such a principle.

Meanwhile, the transparent display 110 may be configured of a touch screen to receive a selection of the user by a touch of the user.

The camera 120 may capture an image of a background direction of the transparent display apparatus 100 to obtain a background image. In detail, the camera 120, which is to capture an image of a background projected to the transparent display 110 to be capable of being viewed by the user, may be disposed on a rear surface opposing a front surface of the transparent display apparatus 100 on which the user is positioned. In addition, the camera 120 may be disposed on one side of the rear surface of the transparent display apparatus 100, and capture the image of the background. In addition, in the case in which the transparent display apparatus 100 is the OST-HMD, the camera 120 may be disposed at a position close to the user's eyes. For example, in the case in which the transparent display apparatus 100 is the OST-HMD, the camera 120 may be disposed at at least one of an upper end of the center, a lower end of the center, a left side, and a right side of the transparent display apparatus 100. As described above, the camera 120 may be used to obtain an image of a region of a sight line of the user, in an embodiment for tracking the sight line of the user.

The processor 130 may correct the image to be displayed on the transparent display 110, and control the transparent display 110 to display the corrected image. In detail, the processor 130 may correct the image to be displayed in an XYZ colorimetric system. Here, the processor 130 may correct an image to be displayed using a background region projected to the transparent display 110 in the background image obtained by the camera 120 in the XYZ colorimetric system. In detail, the processor 130 may analyze image information of the background region for each pixel, and correct the image to be displayed using the analyzed image information. Here, the background region may be determined by a size of the transparent display 110, a position of the camera 120, or the like.

The processor 130 may convert the image to be displayed and the image information of the background region into the XYZ colorimetric system. Here, the image to be displayed and the image of the background region that are converted may be based on various colorimetric systems such as RGB, YUV, HSV, and the like. Meanwhile, hereinafter, for convenience of explanation, only a case in which the conversion is performed in the XYZ colorimetric system is described. However, the conversion may also be performed in various colorimetric systems such as a CIE colorimetric system, a Lab colorimetric system, and the like, in addition to the XYZ colorimetric system, at the time of actual implementation.

In detail, the processor 130 may convert each pixel value of the image to be displayed and the image of the background region into an XYZ value. Here, the XYZ value means a value in the XYZ colorimetric system and has a vector form of [X, Y, Z], and a calculation may be applied to each of X, Y, and Z.

The XYZ colorimetric system is a colorimetric system in which a relative spectral power density may be evaluated by three color matching functions $x(\lambda)$, $y(\lambda)$, and $z(\lambda)$, and may be derived from an RGB colorimetric system by a method of linear transformation. A basic stimulus of the XYZ colorimetric system is an equi-energy spectrum. The y(λ) function, which is one of the three color matching functions, is configured to coincide with a relative luminous efficiency function. In addition, a viewing field diameter of the XYZ colorimetric system is applied between 1 degree and 4 degrees (0.017 to 0.07 rad). The XYZ colorimetric system is generally defined as a colorimetric system for a viewing field of 2 degrees.

The processor 130 may reflect the XYZ value of the image of the background region to correct the XYZ value of the image to be displayed on the transparent display 110. In detail, the processor 130 may reflect a predetermined percentage, or ratio, of the XYZ value of the image of the background region to correct the XYZ value of the image to be displayed. For example, as in Equation (1), the XYZ value of the image to be displayed may be corrected by subtracting the predetermined ratio of the XYZ value of the image of the background region from the XYZ value of the image to be displayed. Hereinafter, for convenience of explanation, the XYZ value of the image to be displayed will be referred to as $XYZ_{original\ image}$.

$$XYZ_{corrected} = XYZ_{original\ image} - \alpha * XYZ_{background} \quad (1)$$

Here, α may be a value greater than 0 and less than or equal to 1 (0<α≤1).

In detail, as a becomes close to 1, the magnitude of correction performed on an image input, to be displayed on the transparent display 110 may be increased.

However, a method for correcting the XYZ value of the image to be displayed on the transparent display 110 is not limited to the method that uses the subtraction as in the above Equation (1). That is, various methods such as a method for correcting the XYZ value of the image to be displayed by multiplying the XYZ value of the image to be displayed itself by a predetermined value, and the like, may be adopted.

Meanwhile, in the case in which the image is corrected as in the above Equation (1), an image recognized by the user may be represented as in Equation (2).

$$XYZ_{observed} = (XYZ_{original\ image} - \alpha * XYZ_{background}) + XYZ_{background} \quad (2)$$

The processor 130 may determine the most appropriate ratio (α) by which the background image is multiplied in a range of a value greater than 0 and less than or equal to 1. In detail, the processor 130 may determine the most appropriate ratio on the basis of at least one of a clipping level and a color distortion level of each pixel of the image due to the correction. In detail, the processor 130 may determine a so that the clipping level and the color distortion level of each pixel of the image due to the correction are minimal as in Equation (3).

$$\alpha_{optimized} = \arg\min_\alpha(Error_{clip} + c * Error_{color}) \quad (3)$$

Here, $Error_{clip}$ may mean a clipping level of each pixel of the corrected image, and $Error_{color}$ may mean a color distortion level of each pixel of the corrected image as compared with an original image. In addition, a constant c may be 2.

Here, the clipping may be generated when a brightness of the background image is brighter, that is, the XYZ value is larger, in the case in which the correction is performed on the basis of the above equation (1). In detail, in the case in which the brightness of the background image is brighter than a brightness of the image to be displayed, a negative number may be included in the corrected XYZ value. However, since the negative number does not exist in a color, a value is displayed as 0 in a pixel in which the negative number is included in the corrected XYZ value, such that information of an original image is lost, which is called the clipping.

That is, when the XYZ value of the pixel of the corrected image is a negative number, the processor 130 may decide the clipping level ($Error_{clip}$) depending on correction using an expected value of an absolute value of the XYZ value, which is the negative number, of the corrected image, as in Equation (4).

$$Error_{clip} = E_{XYZcorrected<0}[|XYZ_{original\ image} - XYZ_{corrected}|]/Y_{Max} \quad (4)$$

Here, E is an expected value, $Y_{Max}$ is a peak luminance value of the transparent display apparatus 100, and normalization may be performed by dividing the expected value by the peak luminance. However, the normalization is not a necessary process, but may be omitted, if necessary.

Meanwhile, the processor 130 may decide the color distortion level ($Error_{color}$) of each pixel of the corrected image as compared with the original image as in Equation (5).

$$Error_{color} = E[|x_{observed} - x_{original\ image}|] + E[|y_{observed} - y_{original\ image}|] \quad (5)$$

Here, the color distortion may mean a difference between a color of the corrected image recognized by the user and a color of the original image. In detail, the processor 130 may decide the color distortion by comparing [x, y] values, which are quantitative chromaticity, with each other. Here, $$x = \frac{X}{X+Y+Z} \text{ and } y = \frac{Y}{X+Y+Z}.$$

Meanwhile, a method for measuring the color distortion level ($Error_{color}$) is not limited to the above Equation (5) that uses x and y. That is, the color distortion level may also be measured using Equation (6).

$$Error_{color} = E[|h_{observed} - h_{original\ image}|] \quad (6)$$

Here, h may mean a hue error of a color space of CIELab.

Meanwhile, the processor 130 may determine optimized ratios to be applied to the image information of the background image for each frame of the image to be displayed on the transparent display 110 or determine optimized ratios to be applied to the image information of the background image for each of a plurality of frames of the image to be displayed.

Meanwhile, the processor 130 may delay frames of the image to be displayed to determine the optimized ratios to be applied to the image information of the background image. For example, when a frame rate of the image to be displayed is thirty frames/second, the processor 130 may delay the frames for one second, determine the optimized ratios to be applied to the image of the background region for each of the thirty frames that are delayed, and correct the respective frames using the determined ratios.

According to an embodiment of the disclosure described above, the image may be effectively corrected without loss of the image to be displayed.

Meanwhile, the processor 130 may determine a plurality of predetermined ratios applied to the image information of the background region for each region. For example, when a boundary at which a difference of the XYZ value is a predetermined value or more exists in the image of the background region, the processor 130 may determine the predetermined ratios for each region on the basis of the boundary. In detail, when a brightness or a color of a region is different by a predetermined value or more from that of another region in the image of the background region, the processor 130 may differently determine ratios applied to the region of the background image for each region on the basis of the boundary at which the brightness or the color is different. Here, when the ratios applied to the image for each region are different from each other by a predetermined value or more, an intermediate value of the respective ratios may be applied in a boundary range to correct the image so that the boundary is naturally displayed in the entire image.

Therefore, even in the case in which a region that is very bright or whose color is different exists in the image of the background region, the image to be displayed may be effectively corrected, such that it is possible to allow the user to view the corrected image as if he/she watches only the image reproduced without being overlapped with the background.

Meanwhile, the processor 130 may differently determine optimized ratios to be applied to the image information of the background region with respect to each of the X, Y, and Z values of the image of the background region. For example, when only one of the X, Y, and Z values of the image of the background region is very large, the processor 130 may determine a ratio applied to the image with respect to the one value that is very large to be larger than those applied to the image with respect to the other values, to effectively remove the image of the background region.

Therefore, even in the case in which the color of the image of the background region is close to a boundary in the color space, the color of the background region may be effectively removed from the image to be displayed.

In addition, the processor 130 may convert the image corrected in the XYZ colorimetric system into the RGB colorimetric system, and provide the converted image to the transparent display 110 so that the transparent display 110 displays the converted image.

Figure 3:
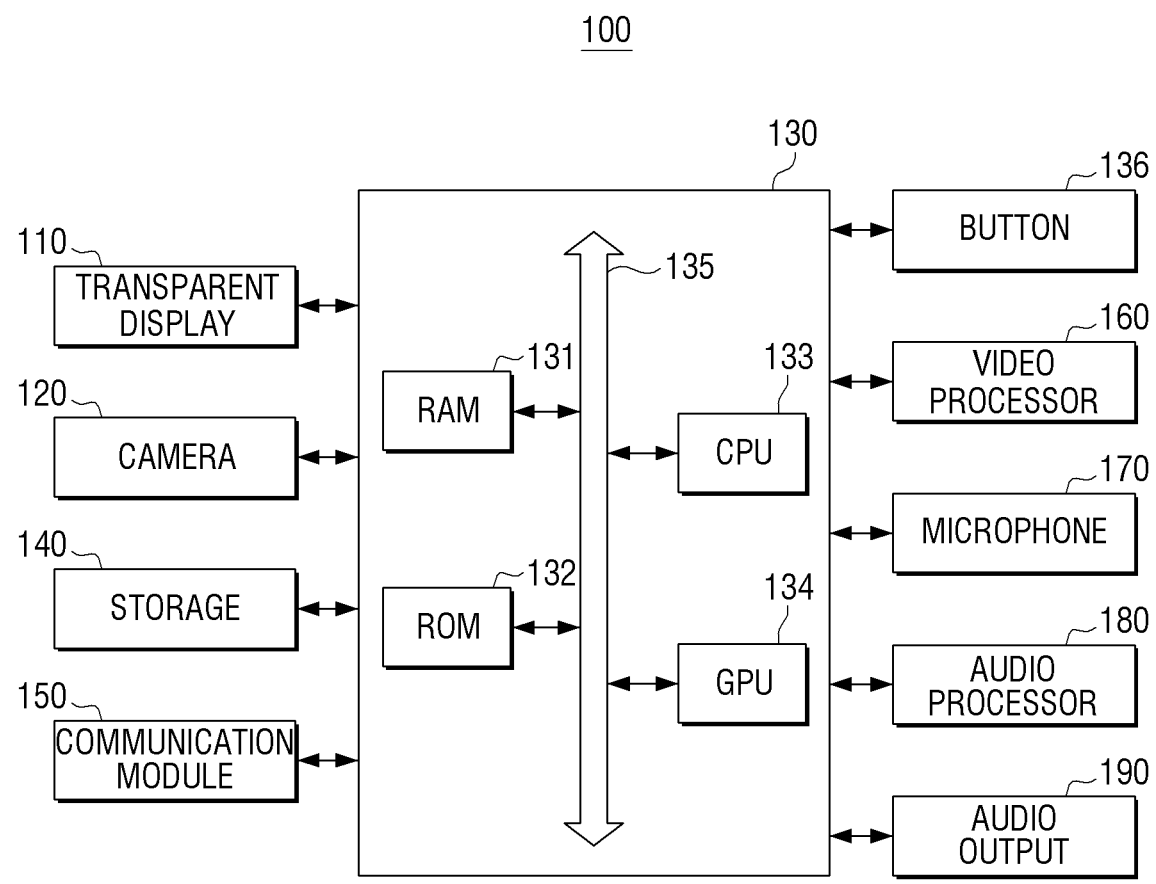
FIG. 3 is a block diagram illustrating a detailed configuration of the transparent display apparatus according to an embodiment of the disclosure.

FIG. 3 is a block diagram illustrating a detailed configuration of the transparent display apparatus according to an embodiment of the disclosure.

Referring to FIG. 3, the transparent display apparatus 100 may include the transparent display 110, the camera 120, the processor 130, a storage 140, a communication module 150, a video processor 160, a microphone 170, an audio processor 180, and an audio output 190. Here, the transparent display 110 and the camera 120 are the same as those illustrated in FIG. 2, and an overlapped description is thus omitted.

The storage 140 may store various programs and data required for an operation of the transparent display apparatus 100. In detail, a table through which pixel values of an image may be converted into the XYZ colorimetric system may be stored in the storage 140. In addition, the storage 140 may store the optimized ratios to be applied to the image of the background region, determined by the processor 130. Here, the optimized ratios to be applied to the image of the background region may be determined for each frame of the image to be displayed on the transparent display 110 or be determined for each of the plurality of frames. In addition, when the boundary exists in the image of the background region, the optimized ratios to be applied to the image of the background region may be determined for each region on the basis of the boundary. In addition, in the case in which the color of the image of the background region is close to the boundary in the color space, when the boundary exists in the image of the background region, the optimized ratios may be determined with respect to each of the X, Y, and Z values.

The communicating module 150 is a component performing communication with various types of external apparatuses in various manners of communication. The communication module 150 may include a wireless fidelity (Wi-Fi) chip, a Bluetooth chip, a wireless communication chip, and a near field communication (NFC) chip. The processor 130 may perform communication with various external apparatuses using the communication module 150.

In detail, the communication module 150 may receive an image that is to be displayed on the transparent display 110 from an external apparatus.

The Wi-Fi chip and the Bluetooth chip perform communication in a Wi-Fi manner and a Bluetooth manner, respectively. In the case of using the Wi-Fi chip or the Bluetooth chip, various connection information such as a service set identifier (SSID), a session key, and the like, is first transmitted and received, communication is connected using the connection information, and various information may then be transmitted and received. The wireless communication chip means a chip performing communication depending on various communication protocols such as Institute of Electrical and Electronics Engineers (IEEE), Zigbee, 3rd generation (3G), 3rd generation partnership project (3GPP), long term evolution (LTE), and the like. The NFC chip means a chip operated in an NFC manner using a band of 13.56 MHz among various radio frequency identification (RFID) frequency bands such as 135 kHz, 13.56 MHz, 433 MHz, 860 to 960 MHz, 2.45 GHz, and the like.

The processor 130 may include a random access memory (RAM) 131, a read only memory (ROM) 132, a central processing unit (CPU) 133, a graphic processing unit (GPU) 134, and a bus 135. The RAM 131, the ROM 132, the CPU 133, the GPU 134, and the like, may be connected to each other through the bus 135.

The CPU 133 accesses the storage 140 to perform booting using an operating system (O/S) stored in the storage 140. In addition, the CPU 133 performs various operations using various programs, contents, data, and the like, stored in the storage 140.

An instruction set for booting a system, or the like, is stored in the ROM 132. When a turn-on command is input to supply power, the CPU 133 may copy the O/S stored in the storage 140 to the RAM 131 depending on an instruction stored in the ROM 132, and execute the O/S to boot the system. When the booting is completed, the CPU 133 copies various programs stored in the storage 140 to the RAM 131, and executes the programs copied to the RAM 131 to perform various operations.

The GPU 134 displays a user interface (UI) on the transparent display 110 when the booting of the transparent display apparatus 100 is completed. In detail, the GPU 134 may render a screen including various objects such as an icon, an image, a text, and the like, using a calculator (not illustrated) and a renderer (not illustrated). The calculator calculates attribute values such as coordinate values at which the respective objects will be displayed, forms, sizes, colors, and the like, of the respective objects depending on a layout of a screen. The renderer renders screens of various layouts including objects on the basis of the attribute values calculated in the calculator. The screens (or user interface windows) rendered in the renderer are provided to the transparent display 110 and are displayed on a main display region and a sub display region, respectively.

A button 136 may be various types of buttons such as a mechanical button, a touch pad, a wheel, and the like, formed in any region such as a front surface portion, a side surface portion, a rear surface portion, and the like, of a body appearance of the transparent display apparatus 100.

The video processor 160 is a component for processing video data included in a content received through the communication module 150 or a content stored in the storage 140. In the video processor 160, various kinds of image processing such as decoding, scaling, noise filtering, frame rate converting, resolution converting, and the like, for the video data may be performed.

The audio processor 180 is a component for processing audio data included in the content received through the communication module 150 or the content stored in the storage 140. In the audio processor 180, various kinds of processing such as decoding, amplifying, noise filtering, and the like, for the audio data may be performed.

When a reproduction application for a multimedia content is executed, the processor 130 may drive the video processor 160 and the audio processor 180 to reproduce the multimedia content. In this case, the transparent display 110 may display an image frame obtained by the image processor 160 in at least one of the main display region and the sub display region.

The audio output 190 outputs the audio data obtained by the audio processor 180.

The microphone 170 is a component for receiving a user's voice or other sounds and converting the user's voice or other sounds into audio data. The processor 130 may use the user's voice input through the microphone 170 in a call process or convert the user's voice into audio data and store the audio data in the storage 140. Meanwhile, the microphone 170 may be configured of a stereo microphone receiving a sound from a plurality of positions.

In the case in which the camera 120 and the microphone 170 are provided, the processor 130 may perform a control operation depending on the user's voice input through the microphone 170 or a user's motion recognized by the camera 120. That is, the transparent display apparatus 100 may be operated in a motion control mode or a voice control mode. In the case in which the transparent display apparatus 100 is operated in the motion control mode, the processor 130 may activate the camera 120 to capture an image of the user, track a change in the user's motion, and perform a control operation corresponding to the tracked change. In the case in which the transparent display apparatus 100 is operated in the voice control mode, the processor 130 may analyze the user's voice input through the microphone 170, and may be operated in a voice recognition mode of performing a control operation depending on the analyzed user's voice.

In the transparent display apparatus 100 supporting the motion control mode or the voice control mode, a voice recognition technology or a motion recognition technology may be used in the diverse embodiments described above. For example, in the case in which the user takes a motion as if he/she selects an object displayed on a home screen or utters a voice instruction corresponding to the object, the transparent display apparatus 100 may decide that the corresponding object is selected, and perform a control operation matched to the object.

Although not illustrated in FIG. 3, according to an embodiment, a universal serial bus (USB) port to which a USB connector may be connected, a headset, a mouse, various external input ports for connection to various external terminals such as a local area network (LAN), and the like, a digital multimedia broadcasting (DMB) chip receiving and processing a DMB signal, various sensors, and the like, may be further include in the transparent display apparatus 100.

Figure 4:
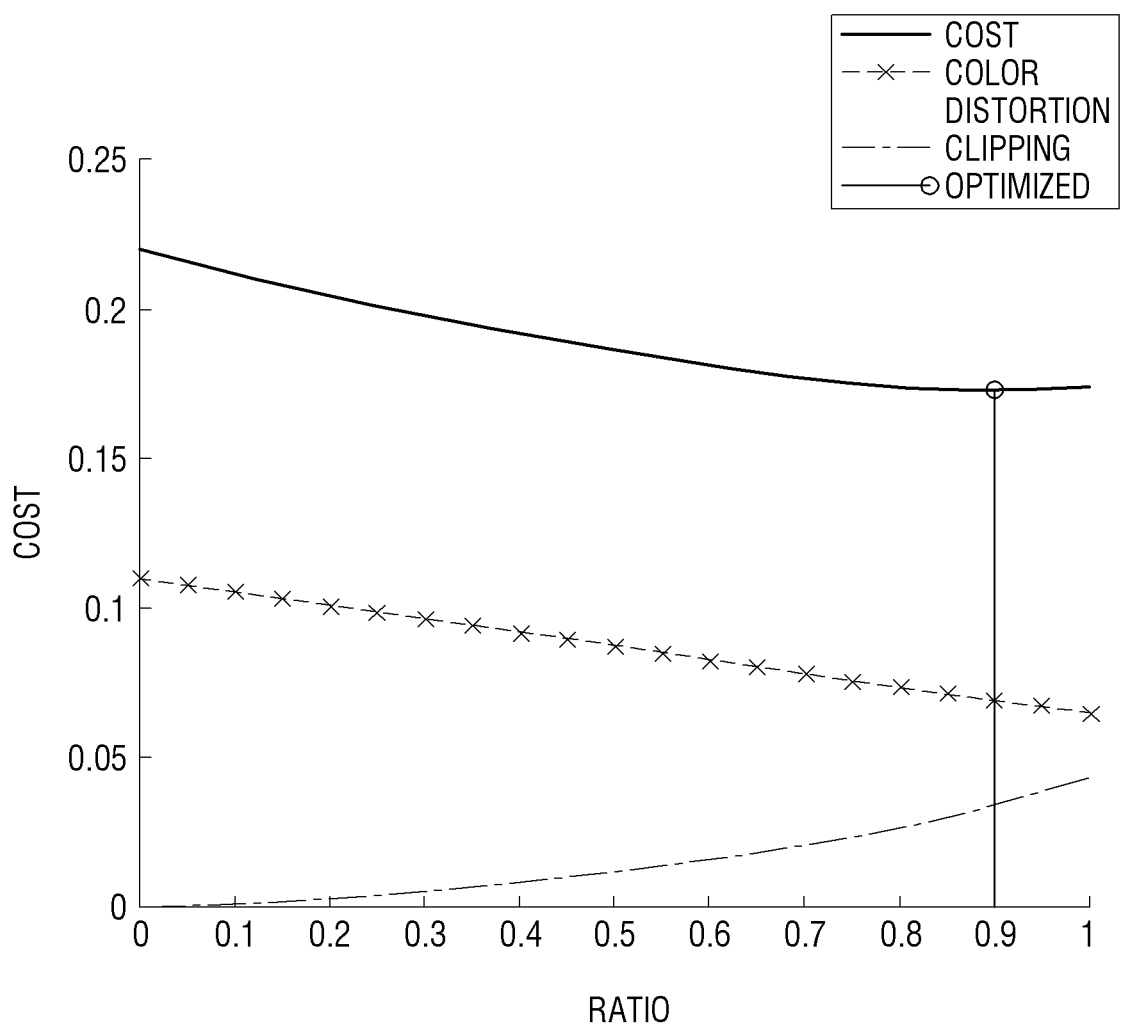
FIGS. 4 and 5 are views illustrating a method for determining a ratio to be applied to an XYZ value of an image of a background region according to an embodiment of the disclosure.
Figure 5:
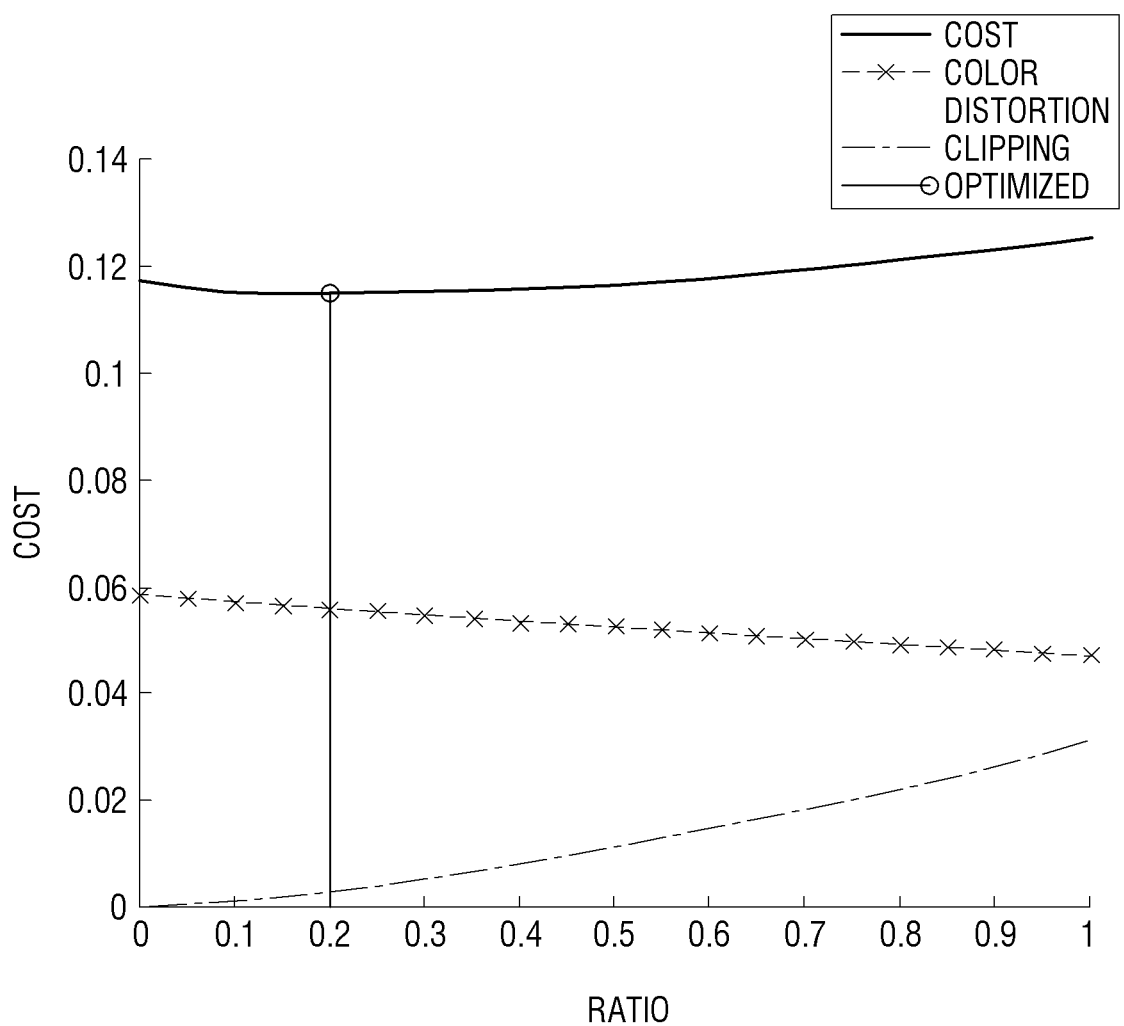

FIGS. 4 and 5 are views illustrating a method for determining ratios to be applied to an XYZ value of an image of a background region according to an embodiment of the disclosure. As described in the above Equation (3), the optimized ratio to be applied to the XYZ value of the image of the background region may be determined to be a ratio in which the clipping level and the color distortion of the corrected image are minimal.

In detail, FIG. 4 illustrates an embodiment of determining the optimized ratio to be applied to the XYZ value of the image of the background region in the case in which a brightness of the image of the background region is dark.

In addition, FIG. 5 illustrates an embodiment of determining the optimized ratio to be applied to the XYZ value of the image of the background region in the case in which a brightness of the image of the background region is bright.

Referring to FIGS. 4 and 5, as the ratio applied to the XYZ value of the image of the background region becomes large, that is, as the magnitude of the correction performed on the image to be displayed is increased, the clipping level is increased, and the color distortion level is decreased. In detail, it is advantageous that the ratio applied to the XYZ value of the image of the background region becomes large to decrease the color distortion, but it is disadvantageous that the ratio applied to the XYZ value of the image of the background region becomes large when considering the clipping of the image.

Therefore, the transparent display apparatus 100 may define a function considering both the clipping level and the color distortion level as a cost function depending on the correction, and determine that a ratio in which a cost function value obtained by summing the clipping level and the color distortion level is minimal is the optimized ratio to be applied to the XYZ value of the image of the background region.

Therefore, as illustrated in FIG. 4, in an embodiment corresponding to a dark background in which the clipping is less, the optimized ratio to be applied to the XYZ value of the image of the background region may be determined to be 0.9 in which the cost function value obtained by summing the clipping level and the color distortion level is minimal.

On the other hand, therefore, as illustrated in FIG. 5, in an embodiment corresponding to a bright background in which the clipping is prone to be generated, the optimized ratio to be applied to the XYZ value of the image of the background region may be determined to be 0.2 in which the cost function value obtained by summing the clipping level and the color distortion level is minimal.

Meanwhile, the cost functions illustrated in FIGS. 4 and 5 are only examples for convenience of explanation, and the disclosure is not limited thereto. That is, the optimized ratio to be applied to the XYZ value of the image of the background region may be variously selected in a range of a value greater than 0 and less than or equal to 1 in consideration of a brightness, a color, and the like, of the image of the background region.

FIGS. 6A to 6D are views illustrating images corrected by a correction method according to an embodiment of the disclosure.

Figure 6A:
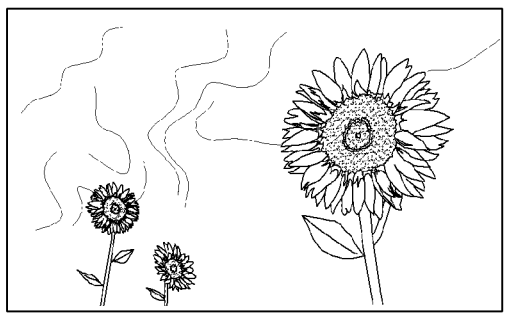
FIGS. 6A to 6D are views illustrating images corrected by a correction method according to an embodiment of the disclosure.
Figure 6B:
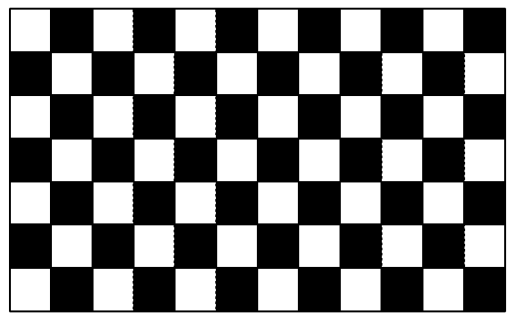

FIG. 6A illustrates an input image that is to be displayed, and FIG. 6B illustrates an image of a background region captured by the capturer.

Figure 6C:
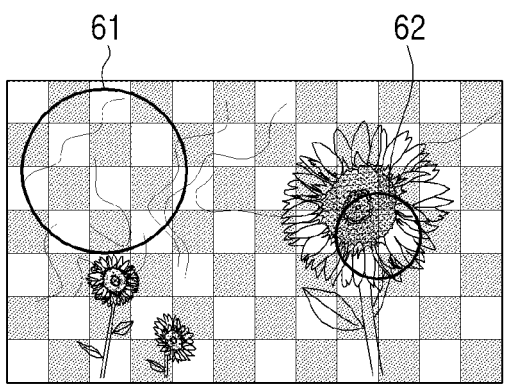

In addition, FIG. 6C illustrates an image before being corrected, recognized by the user. In addition, FIG. 6C illustrates an image recognized by the user in a state in which the input image illustrated in FIG. 6A, displayed on the transparent display is overlapped with the background region projected to the transparent display.

Referring to FIG. 6C, in a region 61 in which a blank space is large in the displayed image, the projected background region is clearly recognized, such that visibility of an image that needs to be recognized as a blank space is deteriorated. In addition, in a region 62 in which an object is displayed, the projected background region is not clearly recognized due to the object, but it may be confirmed that the background is overlapped with the object even in the region 62 in which the object is displayed, such that visibility of the object is deteriorated.

Figure 6D:
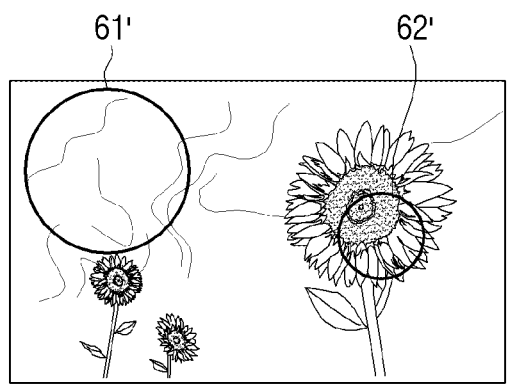

In addition, FIG. 6D illustrates an image after being corrected, recognized by the user. In addition, FIG. 6D illustrates an image recognized by the user in a state in which the corrected image displayed on the transparent display after the correction according to the disclosure is performed on the input image illustrated in FIG. 6A is overlapped with the background region projected to the transparent display.

Referring to FIG. 6D, it may be confirmed that in both of a region 61' in which a blank space is large and a region 62' in which an object is displayed in the displayed corrected image, the background images that are overlapped and recognized are removed.

In detail, the transparent display apparatus 100 may correct the input image illustrated in FIG. 6A in the XYZ colorimetric system using the background image illustrated in FIG. 6B, as described above with reference to FIG. 2.

Meanwhile, although an embodiment in which the background region is completely removed from the image recognized by the user is illustrated in FIG. 6D, the image of the background region may not be completely removed depending on the ratio determined to be applied to the image of the background region in consideration of the clipping level and the color distortion level of the image at the time of actual implementation.

As described above, the image of the background region projected to the transparent display is captured, and the image to be displayed on the transparent display is corrected in the XYZ colorimetric system on the basis of the captured image, such that the clipping and the color distortion of the image to be displayed may be minimized, and the image of the background region may be removed from the image recognized by the user.

FIG. 7 is a flow chart for describing a method for controlling a transparent display apparatus according to an embodiment of the disclosure.

First, the transparent display apparatus may obtain the background image (S710). In detail, the transparent display apparatus may capture the image behind the transparent display apparatus using the camera included in the transparent display apparatus or a camera provided as an external apparatus to obtain the background image.

Then, the transparent display apparatus may analyze each pixel of the image information of the background region (S720). In detail, the transparent display apparatus may determine the background region projected to the transparent display in the obtained background image, and analyze each pixel of the image of the determined background region. Here, the image information may include a position and a color brightness of each pixel.

Then, the transparent display apparatus may correct the image to be displayed using the background region (S730). In detail, the transparent display apparatus may convert the image information of the background region into the XYZ colorimetric system. In this case, the transparent display apparatus may convert the obtained background image into the XYZ colorimetric system, and then determine the background region projected to the transparent display.

In addition, the transparent display apparatus may also convert the image to be displayed on the transparent display into the XYZ colorimetric system, and may correct the image to be displayed on the transparent display using the XYZ value of the image of the background region. In detail, the transparent display apparatus may correct the image to be displayed in a manner of subtracting a value obtained by applying the predetermined ratio to the XYZ value of the image of the background region from the XYZ value of the image to be displayed. Here, the predetermined ratio may be determined in consideration of the clipping level and the color distortion level of the corrected image in the range of the value greater than 0 and less than or equal to 1. Here, the color distortion level may mean a difference between a color recognized by the user when the corrected image is displayed on the transparent display and a color of an original input image.

Then, the transparent display apparatus may display the corrected image (S740). In detail, the transparent display apparatus may convert the image corrected in the XYZ colorimetric system into the RGB colorimetric system and display the converted image on the transparent display. Here, the colorimetric system into which the image corrected in the XYZ colorimetric system is converted is not limited to the RGB colorimetric system, but may be various colorimetric systems such as YUV, HSV, and the like. Meanwhile, hereinabove, for convenience of explanation, only a case in which the conversion is performed in the XYZ colorimetric system is described. However, the conversion may also be performed in various colorimetric systems such as a Lab colorimetric system, a CIE colorimetric system, and the like, in addition to the XYZ colorimetric system, at the time of actual implementation.

As described above, according to the disclosure, the image of the background region projected to the transparent display is captured, each pixel of the image information of the captured image is analyzed, and the image to be displayed on the transparent display is corrected using the analyzed image information, such that the clipping and the color distortion of the image to be displayed may be minimized without shrinking the color gamut of the transparent display apparatus, and the image of the background region may be removed from the image recognized by the user.

Meanwhile, the diverse embodiments of the disclosure described above may be implemented in a computer or a computer readable recording medium using software, hardware, or a combination of software and hardware. As an example, according to a hardware implementation, embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, embodiments described in the disclosure may be implemented by the processor 130 itself. According to a software implementation, embodiments such as procedures and functions described in the disclosure may be implemented by separate software modules. Each of the software modules may perform one or more functions and operations described in the disclosure.

Meanwhile, the methods for controlling a transparent display apparatus according to the diverse embodiments of the disclosure described above may be stored in a non-transitory readable medium. The non-transitory readable medium may be mounted and used in various apparatuses.

The non-transitory readable medium is not a medium that stores data therein for a while, such as a register, a cache, a memory, or the like, but means a medium that semi-permanently stores data therein and is readable by an apparatus. In detail, programs for performing the diverse methods described above may be stored and provided in the non-transitory readable medium such as a compact disc (CD), a digital versatile disc (DVD), a hard disc, a Blu-ray disc, a universal serial bus (USB), a memory card, a read only memory (ROM), or the like.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A transparent display apparatus comprising:
a transparent display;
a camera; and
a processor configured to:
identify a plurality of pixel values of a plurality of regions included in an image obtained by the camera,
apply a predetermined percentage to the plurality of pixel values,
correct a content image based on the plurality of pixel values to which the predetermined percentage is applied,
control the transparent display to display the corrected content image, and
for first and second regions among the plurality of regions, in response to a difference between a pixel value of the first region and a pixel value of the second region adjacent to the first region being greater than or equal to a predetermined value, apply a first predetermined percentage to the pixel value of the first region and apply a second predetermined percentage different from the first predetermined percentage to the pixel value of the second region.

2. The transparent display apparatus as claimed in claim 1, wherein the processor is configured to identify an XYZ value of the obtained image and an XYZ value of the content image, correct the content image by subtracting the predetermined percentage of the XYZ value of the obtained image from the XYZ value of the content image, and provide the corrected content image converted into a RGB colorimetric system to the transparent display.

3. The transparent display apparatus as claimed in claim 2, wherein the predetermined percentage is greater than 0 and smaller than or equal to 100.

4. The transparent display apparatus as claimed in claim 2, wherein the processor is configured to, in response to the XYZ value of the corrected content image being a negative number, determine the predetermined percentage on the basis of at least one of an absolute value of the negative number and a difference between a color of the corrected content image recognized by a user and a color of the content image to be displayed.

5. The transparent display apparatus as claimed in claim 4, wherein the processor is configured to determine the predetermined percentage to be a value in which an expected value of the absolute value of the negative number and the difference between the color of the corrected content image recognized by the user and the color of the content image to be displayed are minimal.

6. The transparent display apparatus as claimed in claim 2, wherein the processor is configured to, in response to a boundary being included in the obtained image, and in response to a difference between an XYZ value on one side of the boundary and an XYZ value on another side of the boundary being a predetermined value or more, determine the predetermined percentage for the one side of the boundary separately from the another side.

7. The transparent display apparatus as claimed in claim 2, wherein the processor is configured to determine the predetermined percentage for each frame of the content image to be displayed.

8. The transparent display apparatus as claimed in claim 2, wherein the processor is configured to determine the predetermined percentage for each of a plurality of frames of the content image to be displayed.

9. The transparent display apparatus as claimed in claim 2, wherein the processor is configured to determine the predetermined percentage for each of X, Y, and Z values of the obtained image.

10. The transparent display apparatus as claimed in claim 1, wherein the transparent display apparatus comprises an optical see-through head mounted display.

11. The transparent display apparatus as claimed in claim 1, wherein the processor is configured to:
identify a region projected to the transparent display among a plurality of regions of the obtained image based on a location of the camera,
identify each pixel value of the identified region and each pixel value of the content image,
compare each pixel value of the identified region with each pixel value of the content image, and
correct each pixel value of the content image based on a difference between each pixel value of the identified region and each pixel value of the content image.

12. The transparent display apparatus as claimed in claim 1, wherein the processor is configured to correct each pixel value of the content image by subtracting the predetermined percentage of each pixel value of the obtained image from each pixel value of the content image, wherein the predetermined percentage is identified based on a clipping level of the corrected content image and a color distortion level of the corrected content image.

13. The transparent display apparatus as claimed in claim 1, wherein a size of the obtained image is equal to a size of the content image.

14. A method for controlling a transparent display apparatus, comprising:
identifying a plurality of pixel values of a plurality of regions included in an image obtained by a camera;
applying a predetermined percentage to the plurality of pixel values;
correcting a content image based on the plurality of pixel values to which the predetermined percentage is applied; and
displaying the corrected content image; and
for first and second regions among the plurality of regions, in response to a difference between a pixel value of the first region and a pixel value of the second region adjacent to the first region being greater than or equal to a predetermined value, applying a first predetermined percentage to the pixel value of the first region and applying a second predetermined percentage different from the first predetermined percentage to the pixel value of the second region.

15. The method for controlling a transparent display apparatus as claimed in claim 14, wherein the correcting includes:
  identifying an XYZ value of the obtained image and an XYZ value of the content image;
  correcting the content image by subtracting the predetermined percentage of the XYZ value of the obtained image from the XYZ value of the content image; and
  providing the corrected content image converted into a RGB colorimetric system to the transparent display.

16. The method for controlling a transparent display apparatus as claimed in claim 15, wherein the predetermined percentage is greater than 0 and smaller than or equal to 100.

17. The method for controlling a transparent display apparatus as claimed in claim 15, wherein the predetermined percentage is determined, in response to the XYZ value of the corrected content image being a negative number, on the basis of at least one of an absolute value of the negative number and a difference between a color of the corrected content image recognized by a user and a color of the content image to be displayed.

18. The method for controlling a transparent display apparatus as claimed in claim 17, wherein the predetermined percentage is determined to be a value in which an expected value of the absolute value of the negative number and the difference between the color of the corrected content image recognized by the user and the color of the content image to be displayed are minimal.

19. The method for controlling a transparent display apparatus as claimed in claim 15, wherein, in response to a boundary being included in the obtained image, and in response to a difference between an XYZ value on one side of the boundary and an XYZ value on another side of the boundary being a predetermined value or more, the predetermined percentage is determined for the one side separately from the another side.

20. The method for controlling a transparent display apparatus as claimed in claim 15, wherein the predetermined percentage is determined for each frame of the content image to be displayed.

21. The method for controlling a transparent display apparatus as claimed in claim 15, wherein the predetermined percentage is determined for each of a plurality of frames of the content image to be displayed.

22. The method for controlling a transparent display apparatus as claimed in claim 15, wherein the predetermined percentage is determined for each of X, Y, and Z values of the obtained image.

23. A non-transitory computer-readable recording medium including a program for executing a method for controlling a transparent display apparatus, wherein the method for controlling the transparent display apparatus includes:
  identifying a plurality of pixel values of a plurality of regions included in an image obtained by a camera;
  applying a predetermined percentage to the plurality of pixel values;
  correcting a content image based on the plurality of pixel values to which the predetermined percentage is applied; and
  displaying the corrected content image;
  for first and second regions among the plurality of regions, in response to a difference between a pixel value of the first region and a pixel value of the second region adjacent to the first region being greater than or equal to a predetermined value, applying a first predetermined percentage to the pixel value of the first region and applying a second predetermined percentage different from the first predetermined percentage to the pixel value of the second region.

\* \* \* \* \*